US012629804B2

(12) United States Patent
    Tsai

(10) Patent No.: US 12,629,804 B2
(45) Date of Patent: May 19, 2026

(54) DISK BRAKE PISTON RETRACTOR

(71) Applicant: CHIEN YU HONG CO., LTD.,
               Taichung City (TW)

(72) Inventor: Chang-Ta Tsai, Taichung City (TW)

(73) Assignee: Chien Yu Hong Co., Ltd., Taichung
               City (TW)

( * ) Notice: Subject to any disclaimer, the term of this
              patent is extended or adjusted under 35
              U.S.C. 154(b) by 328 days.

(21) Appl. No.: 18/398,527

(22) Filed: Dec. 28, 2023

(65) Prior Publication Data

US 2025/0214210 A1     Jul. 3, 2025

(51) Int. Cl.
    *B25B 27/00*     (2006.01)
    *F16D 65/00*     (2006.01)

(52) U.S. Cl.
    CPC ...... *B25B 27/0035* (2013.01); *F16D 65/0043*
                                                (2013.01)

(58) Field of Classification Search
    CPC .............. B25B 27/0035; B25B 27/023; B25B
                     27/0021; B25B 27/068; F16D 65/0043;
                                            Y10T 29/53683
    USPC ...................................... 81/485, 3.7; 29/239
    See application file for complete search history.

(56) References Cited

U.S. PATENT DOCUMENTS

| | | | | |
|---|---|---|---|---|
| 6,095,017 A | * | 8/2000 | Long ................... | F16D 65/0043 |
| | | | | 81/461 |
| 6,192,566 B1 | * | 2/2001 | Dunum ............... | F16D 65/0043 |
| | | | | 29/256 |
| 6,574,846 B1 | * | 6/2003 | Kang .................. | B25B 27/0035 |
| | | | | 29/256 |
| 8,826,504 B1 | * | 9/2014 | Slivon ................ | B25B 27/0035 |
| | | | | 29/244 |
| 10,807,220 B2 | * | 10/2020 | Hernandez, Jr. .... | B25B 27/0021 |
| 11,261,926 B1 | * | 3/2022 | Kuzmic ............... | B60T 17/221 |
| 11,512,749 B1 | * | 11/2022 | Lewis ................... | F16D 65/183 |
| 2004/0065176 A1 | * | 4/2004 | Lin ........................ | B25B 23/12 |
| | | | | 81/125 |
| 2017/0248181 A1 | * | 8/2017 | Wang .................. | F16D 65/0043 |
| 2021/0293290 A1 | * | 9/2021 | Qian ...................... | B25B 27/14 |

\* cited by examiner

*Primary Examiner* — Joel D Crandall
(74) *Attorney, Agent, or Firm* — Wang Law Firm, Inc.

(57) ABSTRACT

A disk brake piston retractor includes two plates, a threaded
rod, an internal tube, an external tube and a quick-release
unit. The threaded rod includes an end connected to the first
plate and a thread extending thereon. The internal tube
includes a first bore extending from a first end, a second bore
extending from a second end, and a thread extending
thereon. The first bore receives the threaded rod. The thread
of the threaded rod extends opposite to the thread of the
internal tube. The quick release unit is operable for con-
necting the second end of the internal tube to the second
plate. The external tube includes a first screw hole extending
from a first end, a second screw hole extending from a
second end. The first screw hole receives the thread of the
threaded rod. The second screw hole receives the thread of
the internal tube.

3 Claims, 4 Drawing Sheets

DISK BRAKE PISTON RETRACTOR

BACKGROUND OF INVENTION

1. Field of Invention

The present invention relates to a disk brake piston of a vehicle and, more particularly, to a disk brake piston retractor.

2. Related Prior Art

A typical disk brake system of a vehicle includes a master cylinder and four disk brakes. Each of the disk brakes includes a server cylinder for driving a piston for moving a caliper for clamping a disk connected to a wheel. To replace the disk with a new one, a retractor is used to retract the piston to cause the caliper to release the disk.

U.S. Pat. No. 8,826,504B1 discloses a disk brake piston retractor tool including a pressure plates 12 and 14, a coupler 16 and a reversible ratchet wrench assembly 18. The pressure plate 12 includes a threaded stud 24. The pressure plate 14 includes a threaded studs 32. The coupler 16 includes a two screw holes 40 and 42 for receiving the threaded studs 24 and 32, respectively. The ratchet wrench assembly 18 is connected to the coupler 16. The ratchet wrench assembly 18 is maneuvered to rotate the coupler 16 to move the pressure plates 12 and 14 away from each other. Thus, the pressure plates 12 and 14 retract a piston of a server cylinder of a disk brake system of a vehicle.

U.S. Pat. No. 11,255,391B2 provides a quick release device for a brake cylinder. The quick release includes two plates 01 and 04, an ejector 02 and a ratchet wrench assembly 03. The plate 01 includes a threaded stud 101. The plate 04 includes a magnetic guide portion 205. The ejector 02 includes a screw hole 204 in a face for receiving the threaded stud 101 and a magnetic steel 203 on an opposite face for attracting the magnetic guide portion 205. The ratchet wrench assembly 03 is connected the ejector 02. The ratchet wrench assembly 03 is operable to rotate the ejector 02 to move the plates 01 and 04 away from each other. Thus, the plates 01 and 04 retract a piston of a servant cylinder of a disc brake system of a vehicle.

Each of the above-described conventional tools includes a ratchet wrench assembly connected to a coupler or ejector. Thus, the above-described conventional tools are bulky. Accordingly, the storage and transportation of the above-described conventional tools are inconvenient.

The present invention is therefore intended to obviate or at least alleviate the problems encountered in the prior art.

SUMMARY OF INVENTION

It is the objective of the present invention to provide a compact and convenient disk brake piston retractor.

To achieve the foregoing objective, the disk brake piston retractor includes two plates, a threaded rod, an internal tube, an external tube and a quick-release unit. The threaded rod includes an end connected to the first plate and a thread extending thereon. The internal tube includes a first bore extending from a first end, a second bore extending from a second end, and a thread extending thereon. The first bore receives the threaded rod. The thread of the threaded rod extends opposite to the thread of the internal tube. The quick release unit is operable for connecting the second end of the internal tube to the second plate. The external tube includes a first screw hole extending from a first end, a second screw hole extending from a second end. The first screw hole receives the thread of the threaded rod. The second screw hole receives the thread of the internal tube.

Other objectives, advantages and features of the present invention will be apparent from the following description referring to the attached drawings.

BRIEF DESCRIPTION OF DRAWINGS

The present invention will be described via detailed illustration of the preferred embodiment referring to the drawings wherein.

DETAILED DESCRIPTION OF PREFERRED EMBODIMENT

Figure 1:
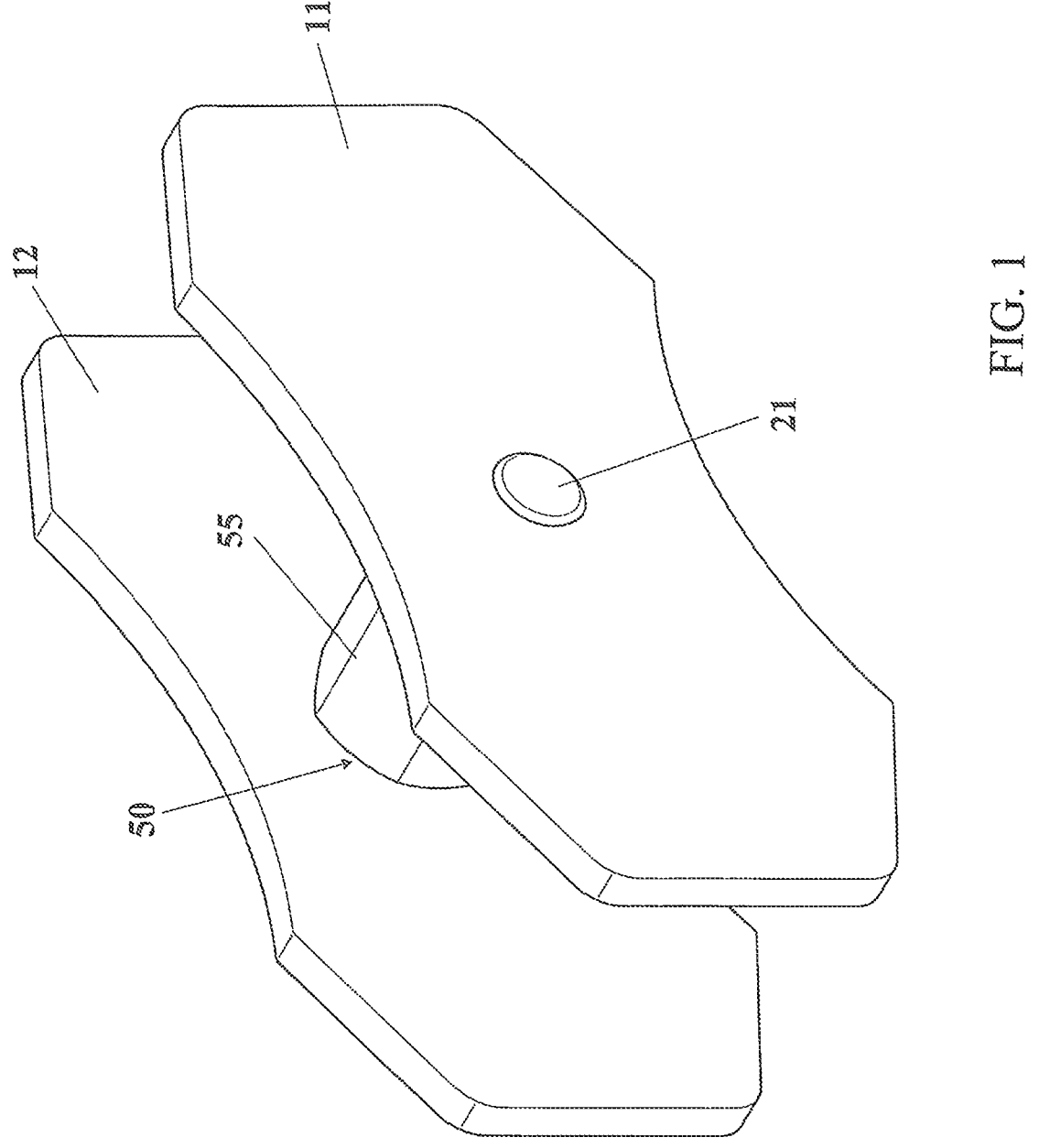
FIG. 1 is a perspective view of a disk brake piston retractor according to the preferred embodiment of the present invention.
Figure 2:
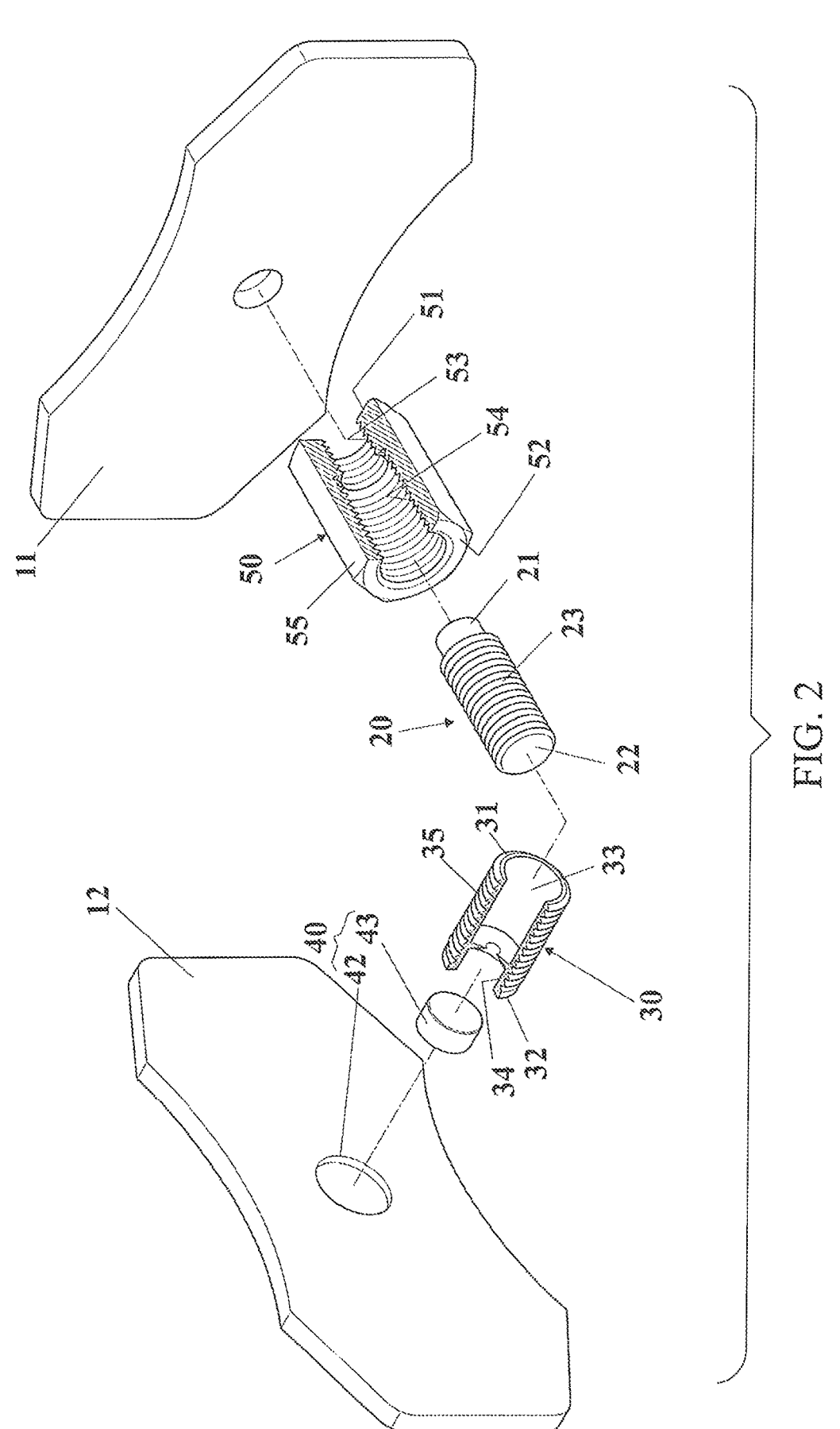
FIG. 2 is an exploded view of the retractor shown in FIG. 1.

Referring to FIGS. 1 through 4, a disk brake piston retractor includes two plates 11 and 12, a threaded rod 20, an internal tube 30, a quick release unit 40 and an external tube 50 according to the preferred embodiment of the present invention.

Both the plates 11 and 12 are made of metal.

The threaded rod 20 includes two ends 21 and 22. The end 21 of the threaded rod 20 is connected to the plate 11 by riveting for example. The threaded rod 20 includes a thread 23 formed with on a periphery.

The internal tube 30 is formed with two ends 31 and 32. A bore 33 extends into the internal tube 30 from the end 31. A bore 34 extends into the internal tube 30 from the end 32. The bore 33 extends longer than the bore 34. The bore 33 receives a section of the threaded rod 20 including the end 22 of the threaded rod 20. The internal tube 30 includes a second thread 35 extending on a periphery (or "external face").

The threads 23 and 35 extend in opposite directions. For example, the thread 23 is a right-hand thread and the thread 35 is a left-hand thread.

The quick release unit 40 provides a quick-release connection of the plate 12 to the end 32 of the internal tube 30. The quick release unit 40 consists of the end 32 of the internal tube 30, a pot hole 42 made in a face of the plate 12 and a magnet 43 connected to the end 32 of the internal tube 30. Preferably, the magnet 43 is fitted in the bore 34 of the tube 30. The end 32 of the internal tube 30 is inserted in the pot hole 42 so that the magnet 43 attracts the plate 12, thereby connecting the internal tube 30 to the plate 12 in a quick-release manner. Hence, an adequate external force can be used to disconnect the internal tube 30 from the plate 12.

The external tube 50 is formed with two ends 51 and 52. A screw hole 53 extends in the external tube 50 from the end 51. A screw hole 54 extends in the external tube 50 from the end 52. The screw hole 53 receives the thread 23 of the threaded rod 20. The screw hole 54 receives the second thread 35 of the internal tube 30. The external tube 50 is formed with a periphery 55 that is polygonal such as hexagonal.

An appropriate tool such as an open-end wrench, a box-ended wrench or a ratchet wrench is operable to engage

Figure 3:
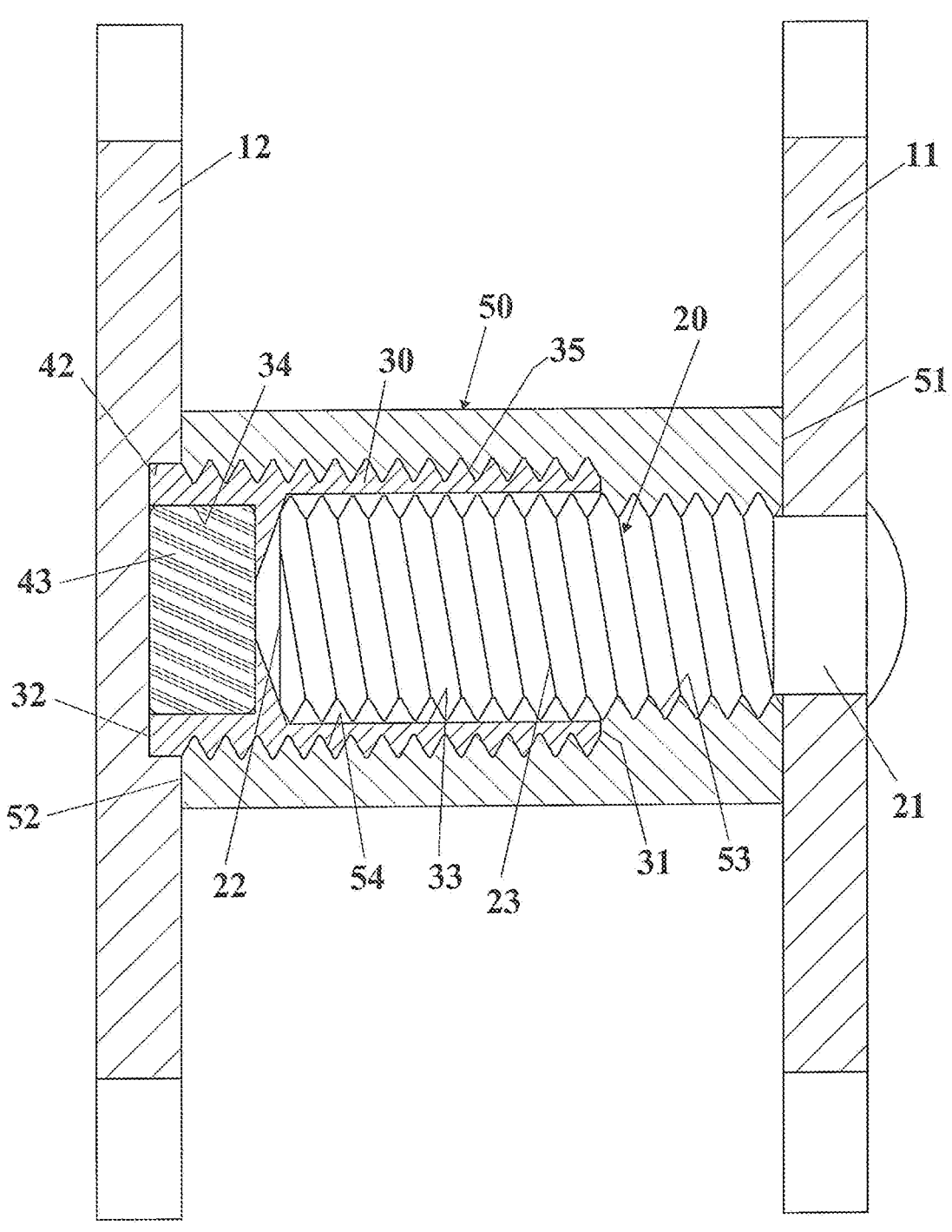
FIG. 3 is a cross-sectional view of the retractor shown in FIG. 1.

3 with the periphery 55 of the external tube 50 so that the tool is operable to rotate the external tube 50. Thus, the threaded rod 20 is movable toward or away from the internal tube 30. Accordingly, the plates 11 and 12 are moveable toward or away from each other as shown in FIGS. 3 and 4, respectively.

Figure 4:
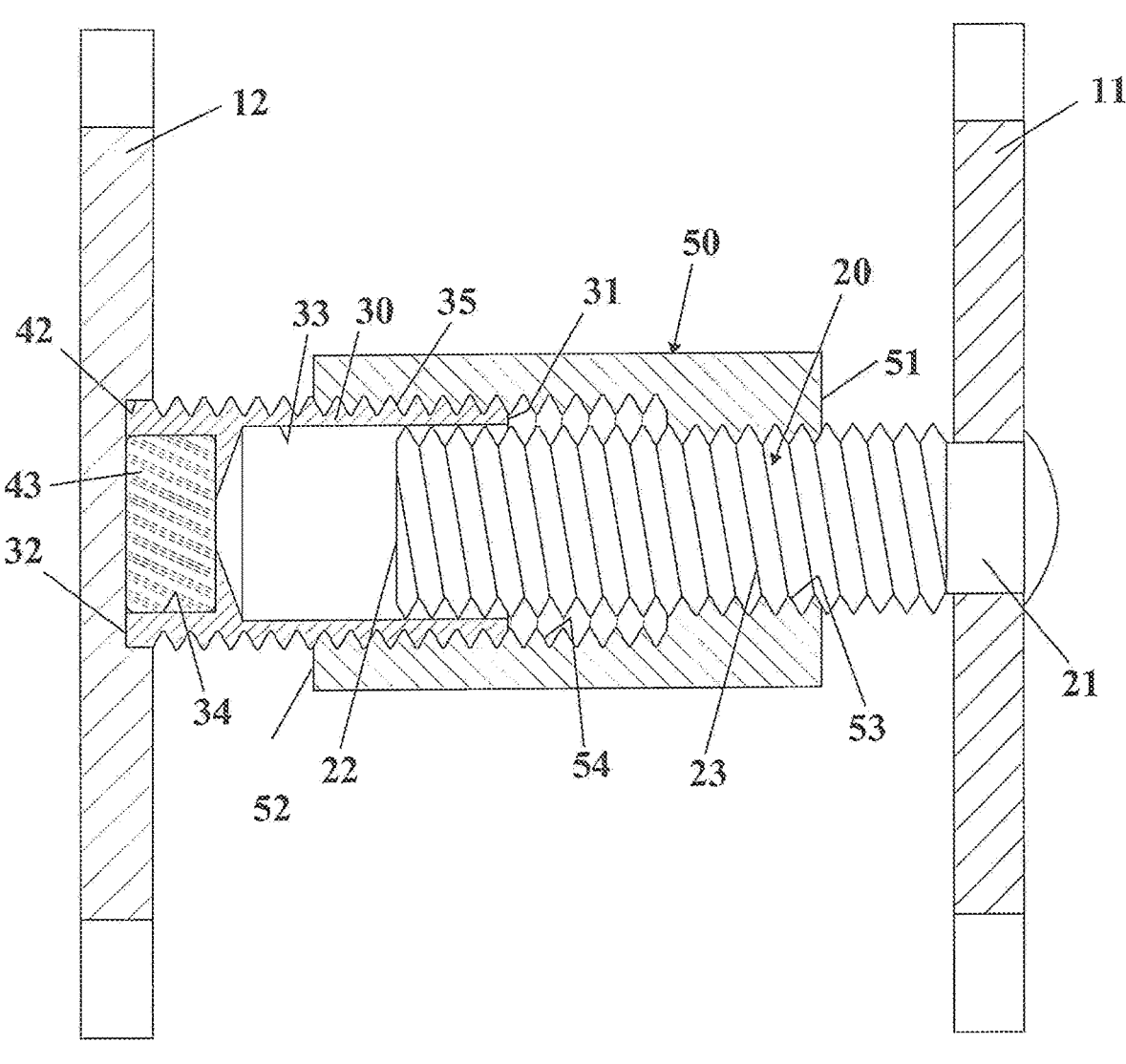
FIG. 4 is a cross-sectional view of the retractor in another position than shown in FIG. 3.

A disk brake piston is retracted when the plates 11 and 12 are in the position shown in FIG. 4.

It should be noted that the quick-release unit 40 is useful to allow temporary detachment of the plate 12 from the internal tube 30 where a box-ended wrench or a ratchet wrench is operable to engage with the periphery 55 of the external tube 50.

Advantageously, the disk brake retractor of the present invention does not include any hand tool such as wrenches. Hence, it is inexpensive and compact.

Moreover, the external tube 50 can be made in various transverse sizes as needed and used with wrenches in various sizes.

Furthermore, by rotating the external tube 50, both the plates 11 and 12 are movable away from the external tube 50 for the use of the screw holes 53 and 54, which extends in opposite directions. Thus, the plates 11 and 12 are quickly movable away from each other by rotating the external tube 50.

Additionally, the quick release unit 40 allows fast temporary detachment of the plate 12 from the internal tube 30 to allow use of a box-ended wrench or a ratchet wrench to engage with the periphery 55 of the external tube 50.

The present invention has been described via the illustration of the preferred embodiment. Those skilled in the art can derive variations from the preferred embodiment without departing from the scope of the present invention. Therefore, the preferred embodiment shall not limit the scope of the present invention defined in the claims.

The invention claimed is:

1. A disk brake piston retractor comprising:
a first plate (11);

4 a second plate (12) made of a ferromagnetic material and formed with a pothole (42);

a threaded rod (20) comprising a first end (21) connected to the first plate (11), a second end (22) located opposite to the first end (21), and a thread (23) extending on a periphery;

an internal tube (30) comprising a first end (31), a second end (32) insertable in the pothole (42), a first bore (33) extending in the internal tube (30) from the first end (31) of the internal tube (30), a second bore (34) extending in the internal tube (30) from the second end (32) of the internal tube (30), and a thread (35) extending on a periphery, wherein the first bore (33) receives the threaded rod (20), wherein the thread (23) of the threaded rod (20) extends opposite to the thread (35) of the internal tube (30);

a quick release unit (40) operable for connecting the second end (32) of the internal tube (30) to the second plate (12) in a quick-release manner, wherein the quick release unit (40) comprises a magnet (43) fitted in the second bore (34) of the internal tube (30); and an external tube (50) comprising a first end (51), a second end (52) located opposite to the first end (51), a first screw hole (53) extending in the external tube (50) from the first end (51) of the external tube (50), a second screw hole (54) extending in the external tube (50) from the second end (52) of the external tube (50), wherein the first screw hole (53) receives the thread (23) of the threaded rod (20), wherein the second screw hole (54) receives the thread (35) of the internal tube (30).

2. The disk brake piston retractor according to claim 1, wherein the external tube (50) comprises a polygonal periphery (55).

3. The disk brake piston retractor according to claim 2, wherein the polygonal periphery (55) of the external tube (50) is a hexagonal periphery.

* * * * *